(12) United States Patent
Wright et al.

(10) Patent No.: US 11,933,397 B2
(45) Date of Patent: *Mar. 19, 2024

(54) METHODS AND SYSTEMS FOR AN ACTUATION SYSTEM

(71) Applicant: Dana Heavy Vehicle Systems Group, LLC, Maumee, OH (US)

(72) Inventors: Robert A. Wright, Haskins, OH (US); Michael Z. Creech, Ann Arbor, MI (US)

(73) Assignee: DANA HEAVY VEHICLE SYSTEMS GROUP, LLC, Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,891

(22) Filed: Aug. 10, 2022

(65) Prior Publication Data

US 2024/0052925 A1 Feb. 15, 2024

Related U.S. Application Data

(62) Division of application No. 17/165,781, filed on Feb. 2, 2021, now Pat. No. 11,486,470.

(60) Provisional application No. 62/970,102, filed on Feb. 4, 2020.

(51) Int. Cl.
| | |
|---|---|
| *F16H 63/00* | (2006.01) |
| *F16H 61/32* | (2006.01) |
| *F16H 63/30* | (2006.01) |
| *F16H 63/32* | (2006.01) |
| *F16H 61/28* | (2006.01) |

(52) U.S. Cl.
CPC .......... *F16H 63/304* (2013.01); *F16H 61/32* (2013.01); *F16H 63/32* (2013.01); *F16H 2061/2869* (2013.01); *F16H 2063/3056* (2013.01)

(58) Field of Classification Search
CPC .... F16H 3/0915; F16H 61/0248; F16H 61/32; F16H 61/682; F16H 63/04; F16H 63/32; F16H 2063/3093; F16H 2200/0034; F16H 2704/04; F16H 2708/08; F16H 63/304; F16H 2063/3056
See application file for complete search history.

(56) References Cited

U.S. PATENT DOCUMENTS

| | | |
|---|---|---|
| 2,715,217 A | 8/1955 | Russell |
| 4,354,396 A | 10/1982 | Charles |
| 5,593,210 A | 1/1997 | Schwarzbich |
| 5,943,918 A | 8/1999 | Reed, Jr. et al. |
| 5,966,989 A | 10/1999 | Reed, Jr. et al. |
| 5,970,811 A | 10/1999 | Imao et al. |

(Continued)

FOREIGN PATENT DOCUMENTS

| | | |
|---|---|---|
| JP | 2012127476 A | 7/2012 |
| WO | 2014082676 A1 | 6/2014 |

*Primary Examiner* — Victor L MacArthur
(74) *Attorney, Agent, or Firm* — McCoy Russell LLP (57) ABSTRACT

Methods and systems are provided for an actuation system for a driveline shifting member in a transmission system of a vehicle. In one example, a system may include an actuator coupled to a lever arm via one or more parallel axis gears, and a shaft connecting the lever arm to a driveline shifting member, the lever arm driven via a rolling element housed within a slot in the lever arm aligned with a center of a parallel axis gear of the one or more parallel axis gears.

15 Claims, 7 Drawing Sheets

(56) References Cited

U.S. PATENT DOCUMENTS

| | | |
|---|---|---|
| 6,003,395 A | 12/1999 | Rogg et al. |
| 6,050,379 A | 4/2000 | Lyon |
| 6,062,097 A | 5/2000 | Imao et al. |
| 6,484,598 B2 | 11/2002 | Peter |
| 6,550,351 B1 | 4/2003 | O'Reilly et al. |
| 6,619,450 B2 | 9/2003 | Ota et al. |
| 7,146,871 B2 | 12/2006 | Ozaki et al. |
| 8,512,195 B2 | 8/2013 | Lohr et al. |
| 8,677,852 B2 | 3/2014 | Neelakantan et al. |
| 9,878,719 B2 | 6/2018 | Carter et al. |
| 10,144,106 B2 | 12/2018 | McLain et al. |
| 10,518,384 B2 | 12/2019 | Mclain et al. |
| 11,486,470 B2 * | 11/2022 | Wright ................. F16H 63/304 |
| 2004/0110593 A1 | 6/2004 | Szalony et al. |
| 2004/0254040 A1 | 12/2004 | Somschor et al. |
| 2011/0040461 A1 | 2/2011 | Wolterman |
| 2013/0247391 A1 | 9/2013 | Armstrong |
| 2021/0131540 A1 | 5/2021 | MacDonald et al. |
| 2021/0148462 A1 | 5/2021 | Pregnolato et al. |
| 2021/0239190 A1 * | 8/2021 | Wright ................. F16H 61/682 |

* cited by examiner

METHODS AND SYSTEMS FOR AN ACTUATION SYSTEM

CROSS-REFERENCE TO RELATED APPLICATIONS

The present application is a divisional of U.S. Non-Provisional patent application Ser. No. 17/165,781, entitled "METHODS AND SYSTEMS FOR AN ACTUATION SYSTEM", and filed on Feb. 2, 2021. U.S. Non-Provisional application Ser. No. 17/165,781 claims priority to U.S. Provisional Patent Application No. 62/970,102, entitled "METHODS AND SYSTEMS FOR AN ACTUATION SYSTEM", and filed on Feb. 4, 2020. The entire contents of the above-listed applications are hereby incorporated by reference for all purposes.

TECHNICAL FIELD

The present description relates generally to methods and systems for a low rotation angle actuation system for a driveline shifting member.

BACKGROUND AND SUMMARY

In an automobile with a power unit, such as an internal combustion engine or electric motor, a transmission system adapts the output of the power unit to the drive wheels to provide a desired propulsion. The transmission may be characterized by gear ratios that are selectable by locking specific gear pairs to an output shaft inside the transmission system, or other approaches for varying the drive ratio. A driveline shifting member, such as a shift fork, may be used to shift connections in the transmission, where the shift fork may be a forked end metal lever that straddles a transmission gear shaft.

In some applications, such as a commercial vehicle transmission system, for example, a very small rotational actuation of a lever may be desired to shift the shift fork, along with a desired high rate of speed and accuracy. Approaches for attaining the desired small rotational output of an actuator coupled to the shift fork may include use of parallel axle gear trains. However, the inventors herein have recognized potential issues with such systems. Use of parallel axle gear trains may result in final stages of gears working on only a small number of teeth instead of a larger range, resulting in potential backlash, reduced accuracy, etc. Also, changes in gear clearance may result in increased wear of working surfaces.

In one example, the issues described above may be addressed by an actuation system in a transmission comprising: a motor coupled to a lever arm via a drive mechanism such as a parallel axis gear train and a shaft connecting the lever arm to a driveline shifting member, the lever arm driven via a rolling element housed within a slot in the lever arm. A cam is established by using an eccentric pin on a final gear of the gear train in which the rolling element is mounted. In this way, by using a cam based linkage connector in a shift fork actuator, small movements in the shift fork and/or small amounts of rotation of an intermediate lever may be carried out with increased accuracy, and a torque benefit may be attained upon moving from neutral to a gear engagement due to geometrical advantages of where increased actuation torque is achieved in the various shift fork positions.

As one example, a shift fork in a transmission system may be selectively coupled to one of two gears. An actuator coupled to the shift fork used for selecting a desired gear ratio may be actuated to move the shift fork in a desired direction to engage with one gear via an actuator. The actuator may require a non-uniform force through a stroke to change the gear engagement. The shift fork may be moved through three positions including a zero degrees position corresponding to neutral when none of the gears are engaged, a positive first angle position corresponding to engagement to a first gear, and a negative second angle position corresponding to engagement to a second gear. The actuator may include a motor connected via a drive mechanism such as a parallel axis gear train. A rolling element housed within a slot may be mounted on a dowel pin coupled to a final gear of the gear train to drive a lever arm coupling the final parallel axis gear to a shaft connected to an arm of the shift fork. The dowel pin is eccentric to the final gear to generate a cam effect. During engagement of a first gear, as the final gear rotates in a first direction, the rolling element may shift within the slot to a first position increasing a torque generated on the lever arm. Similarly, during engagement of a second gear, as the final gear rotates in a second direction (opposite to the first direction), the rolling element may shift within the slot to a second position increasing a torque generated on the lever arm. The movement of the lever arm may cause the arm of the shift fork to be translated in a desired direction for gear engagement.

In this way, by using parallel axis gearing coupled to a lever arm via a rolling element, a small rotational displacement may be amplified and engagement of a gear by the split fork may be efficiently carried out at higher speeds. In addition to actuation of a shift fork of a transmission system, the mentioned actuation system may be used in other driveline members. One or more actuation system may be concurrently used in a transmission system to drive distinct members (such as multiple shift forks). The technical effect of using the actuator is that a simplified arrangement of components may be used in a cost-effective manner for engagement and disengagement of multiple driveline members.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1A:
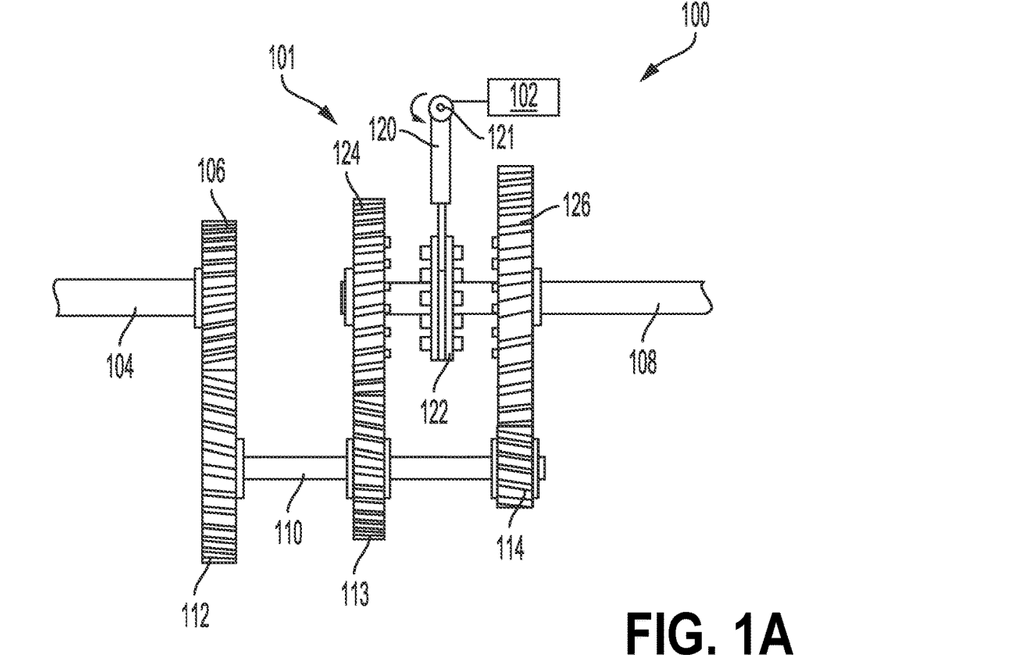
FIG. 1A shows an example transmission system including a shift fork in a first position.
Figure 1B:
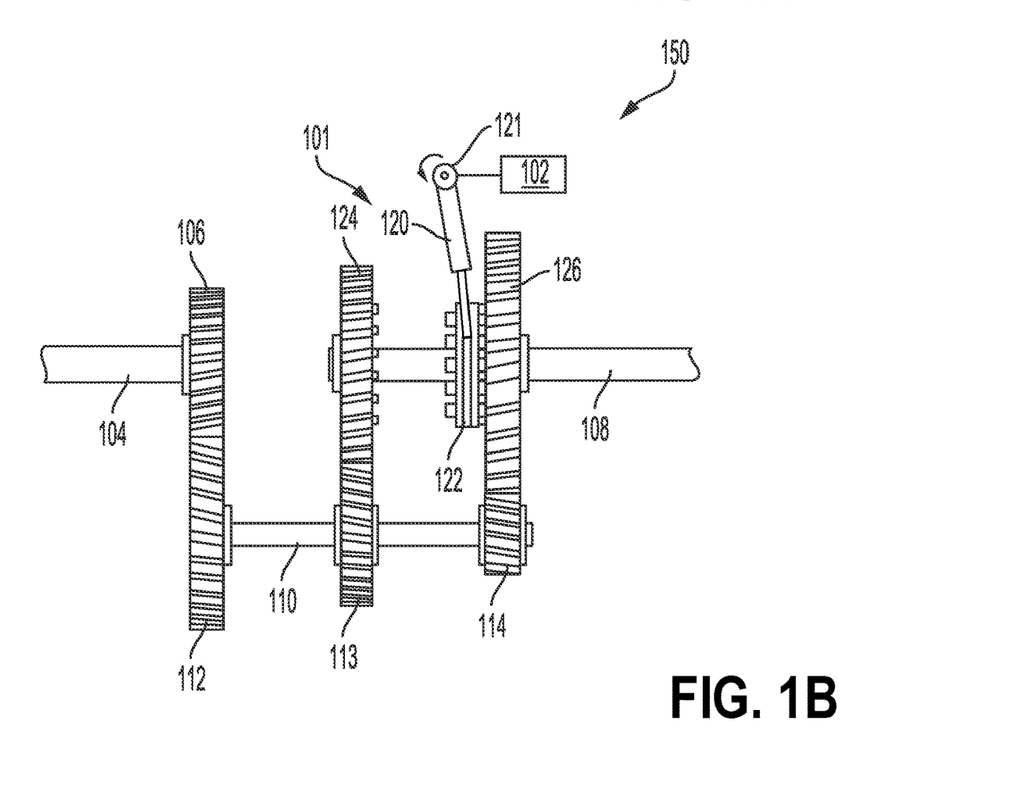
FIG. 1B shows the example transmission system including the shift fork in a second position.
Figure 2:
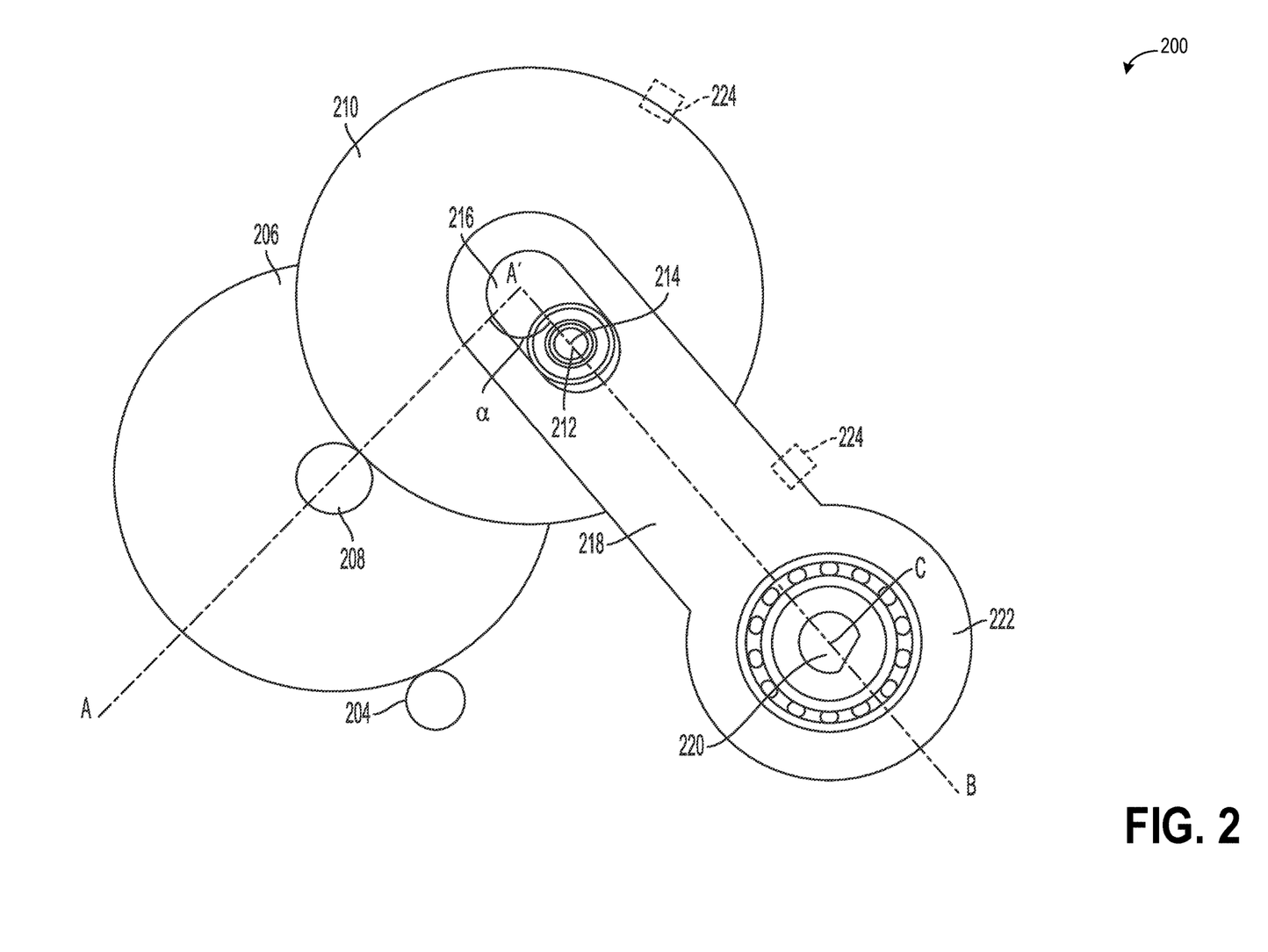
FIG. 2 shows a schematic of an actuation system for actuation of the shift fork of FIGS. 1A-B.
Figure 3:
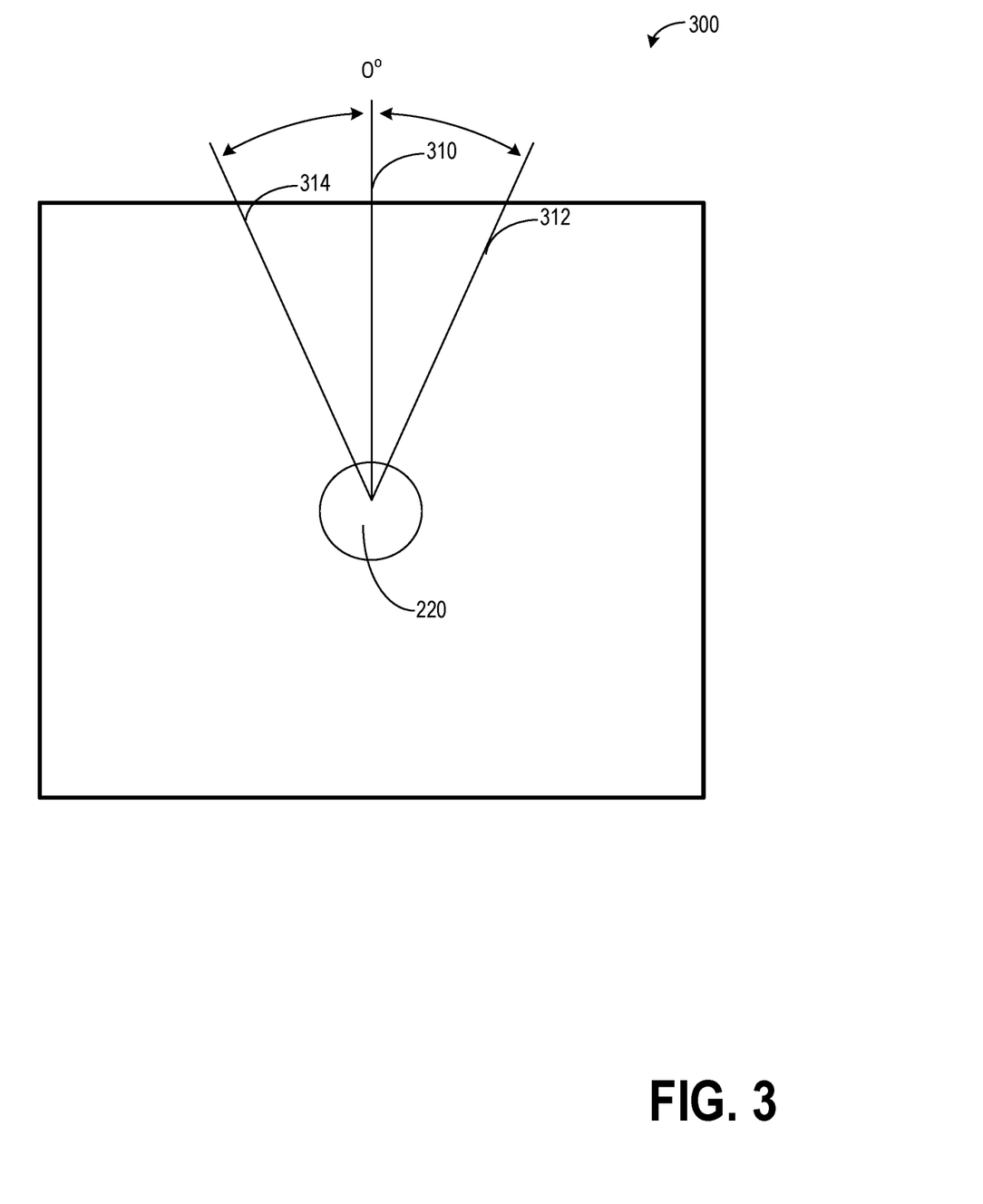
FIG. 3 shows a representation of rotation of a shaft coupling the actuation system and the shift fork.
Figure 4:
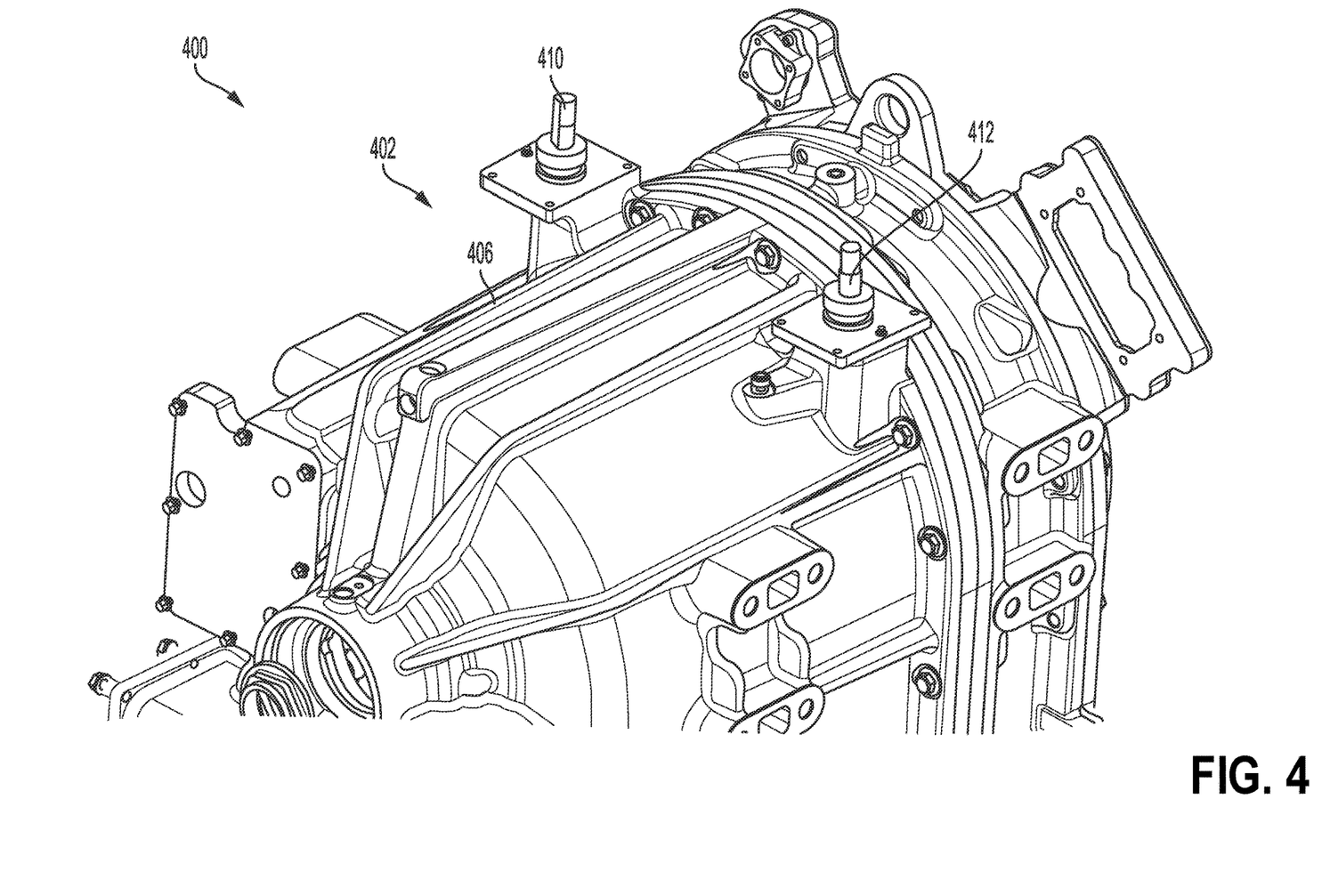
FIG. 4 shows a perspective view of a vehicle component including two actuation systems of FIG. 2.
Figure 5:
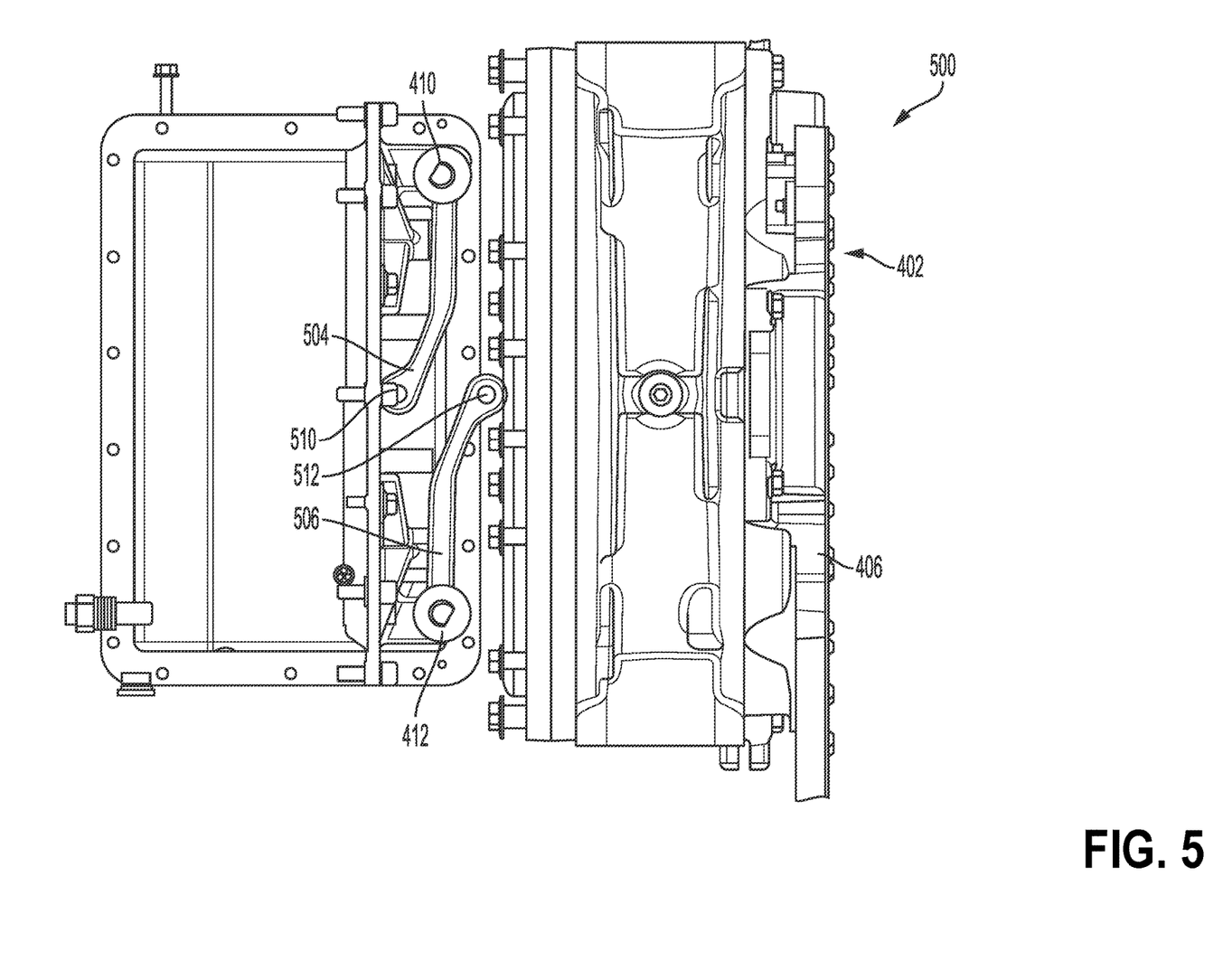
FIG. 5 shows a top view of the vehicle component including two actuation systems of FIG. 2.
Figure 6A:
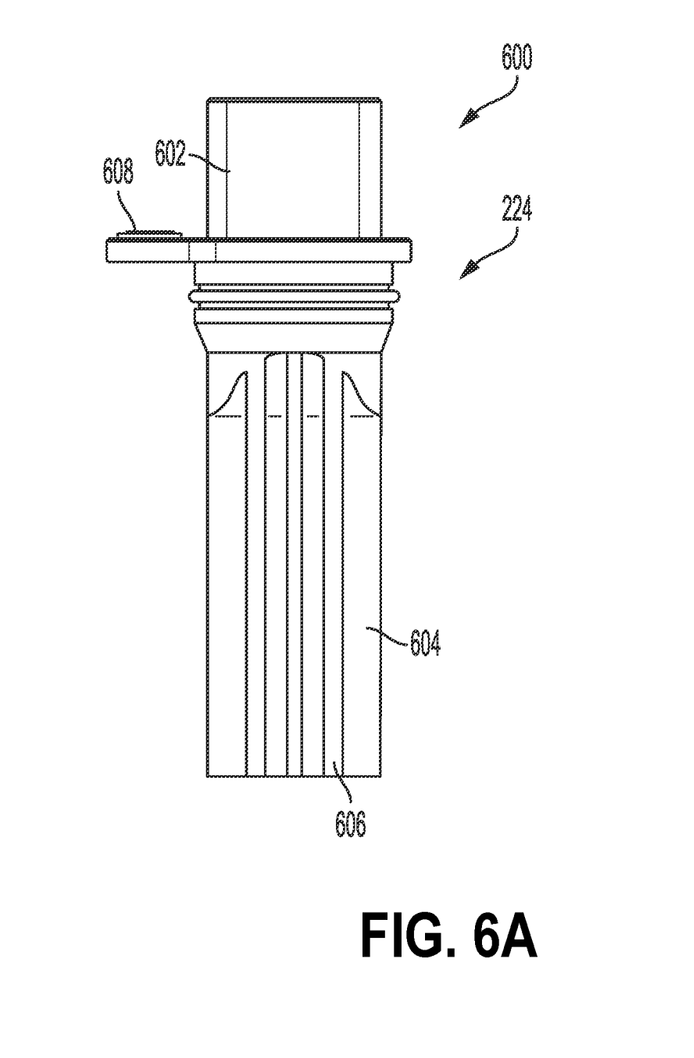
FIG. 6A shows a side view of a sensor coupled to the actuation systems of FIG. 2.
Figure 6B:
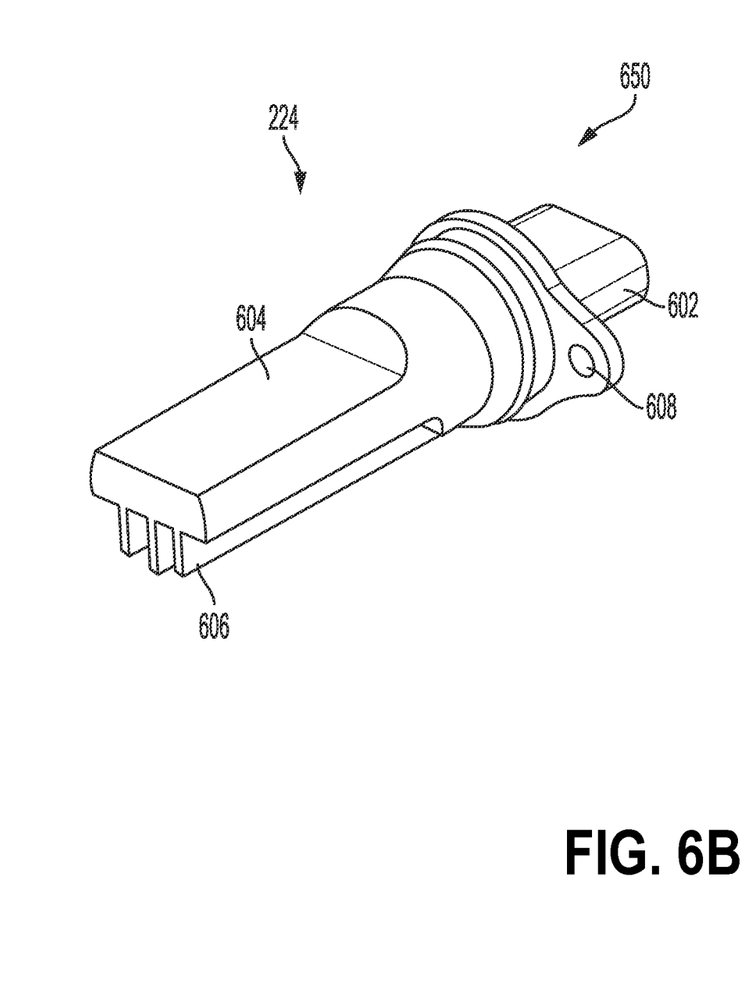
FIG. 6B shows a perspective view of the sensor coupled to the actuation systems of FIG. 2.

The following description relates to systems and methods for a low rotation angle actuation system for a driveline shifting member. The driveline shifting member such as a shift fork may be included in a transmission system of a vehicle, as schematically shown in FIGS. 1A-B. The components of the actuation system are schematically shown in FIG. 2. The shaft of the actuation system coupled to the shift fork may be shifted to a plurality of different positions to engage and disengage desired transmission gears, as shown in FIG. 3. Multiple actuation systems may be coupled to a single vehicle component as shown in FIGS. 4-5. A sensor may be coupled to a component of the actuation system to determine a current position of the shift fork, as shown in FIGS. 6A-B. A vehicle controller may carry out a control routine, such as via the control routine of FIG. 7 to operate the actuation system to actuate the shift fork based on a mode of the transmission system as selected by the user.

FIGS. 1A-B show a simplified schematic of a two speed transmission system 101. A first shaft 104 may be coupled directly to a propulsion system (internal combustion or electric) or indirectly via a clutch (not shown). When a clutch plate is pushed, the clutch may disconnect the engine from the transmission system. When the clutch is released, the engine may be directly coupled to the first shaft 104. The first shaft 104 and a first gear 106 may be connected as a single unit. The first shaft 104 and the first gear 106 may rotate at the same speed as the engine.

The first gear may be coupled to a layshaft 110 via a meshed second gear 112. Two more gears, a third gear 113 and a fourth gear 114 may be mounted on the layshaft. Each of the second gear 112, the third gear 113, and the fourth gear 114 may spin at the same speed as the layshaft 110 and the first gear 106. When the clutch is engaged, the layshaft 110 may directly receive power from the engine via the first shaft 104 and the first gear 106.

The output shaft 108 of the transmission system may be a splined shaft that connects directly to a drive shaft of the vehicle through a differential leading to the drive wheels of the car. When the wheels are spinning, the output shaft 108 may also be spinning. In this example, two transmission gears (first transmission gear 124 and second transmission gear 126) ride on bearings coupled to the output shaft 108. During conditions when the engine is shut-down while the vehicle is coasting, the output shaft 108 may rotate within the transmission gears while the transmission gears and the layshaft 110 may be motionless.

A gear selector shift fork 120 coupled to a collar 122 may be used to select one of the two transmission gears as desired. The collar 122 may be connected through splines to the output shaft and may spin with the output shaft 108. The collar 122 may connect one of the transmission gears to the output shaft 108. Teeth along both sides of the collar may selectively engage with holes on the sides of a selected gear to engage the gear with the output shaft 108. The collar 122 may be moved in a first direction to engage with the first transmission gear 124 and in a second, opposite, direction to engage with the second transmission gear 126. The shift fork 120 may be actuated to move the collar 122 via an actuation system 102. The auction system 102 may be coupled to the shift fork via a shaft 121. The actuation system 102 may include an electric motor coupled to a lever arm via one or more parallel axis gears, and a shaft connecting the lever arm to the shift fork 120, the lever arm driven via a rolling element housed within a slot in the lever arm and eccentric with the final parallel axis gear. The actuation system allows for a small and accurate movement of the shift fork 120 in either direction to completely engage a selected transmission gear. The actuation system is elaborated with reference to FIG. 2.

FIG. 1A shows a first position 100 of the transmission system 101. In the first position, when the collar 122 is positioned between the two transmission gears, the transmission is in neutral. In neutral, each of the transmission gears may freewheel on the output shaft 108 at different rates based on their ratios to the layshaft 110.

FIG. 1B shows a second position 150 of the transmission system 101. In the second position, the collar 122 is shifted along the output shaft 108 via the actuation system 102 of the shift fork 120 to engage the second transmission gear 126 with the collar 122. The first shaft 104 may turn the layshaft 110 which then turns each of the transmission gears. Since the collar is engaged to the second transmission gear 126, engine power may be transmitted from the first shaft 104 to the output shaft 108 of the transmission system via each of the layshaft 110, the fourth gear 114, and the second transmission gear 126. During this condition, the first transmission gear 124 may be freewheeling on its bearing without an effect on the output shaft 108.

In a third position (not shown) of the transmission system 101, the collar 122 may be shifted along the output shaft 108 via the actuation system 102 of the shift fork 120 to engage the first transmission gear 124 with the collar 122. The direction of motion of the shift fork 120 and the collar 122 for engagement of the first transmission gear 124 may be opposite to the direction of motion of the shift fork 120 and the collar 122 for engagement of the first transmission gear 126.

Transmission system 101 is a simplified transmission system. Transmission systems may include more than two transmission gears and a plurality of shift forks and collars, each shift fork and collar corresponding to a single transmission gear or pair of transmission gears. A gear to be engaged may be selected via an onboard control system based on the position of the gear shifter as requested by the vehicle operator in conjunction with various vehicle data (operating conditions).

In another embodiment, a synchronizer may be used for coupling the collar to a selected transmission gear. A synchronizer allows the collar and a transmission gear to make frictional contact before the teeth of the gear is engaged to the collar allowing the collar and the transmission gear to first synchronize their speeds. In a synchronizer arrangement, the transmission gear may include a cone shaped protrusion from its center and the collar may include a cone shaped opening to receive the protrusion upon coupling. Once the cone shaped protrusion of the transmission gear fits into the opening of collar, the outer portion of the collar may slide to engage the teeth of the side of the collar to the transmission gear.

FIG. 2 shows a schematic of an actuation system 200 for actuation of the shift fork of FIGS. 1A-B for selecting a gear of a transmission system. Actuation system 200 may be the actuation system 102 in FIGS. 1A-B. The actuation system may include a first parallel axis gear 206 coupled to a drive motor/pinion gear 204. The drive motor (actuator) 204 may be an electric motor such as a brushless motor, shunt motor, stepper motor, and other types of electric motors. The drive motor 204 may be selectively operated to rotate the first parallel axis gear 206 in a clockwise (first) and an anticlockwise (second) direction.

The first parallel axis gear 206 may include a second attached parallel axis gear 208 fixed to the center of the first parallel axis gear 106. The second parallel axis gear 208 may rotate at the same speed and in the same direction as the first parallel axis gear 206. The second parallel axis gear 208 may provide an interface between the first parallel axis gear 206 and an adjacent final parallel axis gear 210. The second parallel axis gear 208 may be in face sharing contact with a perimeter of the final parallel axis gear 210. In one example, the second parallel axis gear 208 and the perimeter of the final parallel axis gear 210 may include complementary geometries such as teeth and groves that allow effective coupling of the first parallel axis gear 206 and the final parallel axis gear 210 via the second parallel axis gear 208.

The first parallel axis gear 206 and the final parallel axis gear 208 may be substantially coplanar along the A-A'-B plane. Each of the first parallel axis gear 208 and the second parallel axis gear 210 may rotate in both clockwise and anticlockwise directions along their respective central axes.

A lever arm 218 may be coupled to the final parallel axis gear 210 via a dowel pin 212 fixed to and eccentric to the final parallel axis gear 210. The lever arm 218 may include an elongated slot 216 proximal to its first end. A rolling element 214 may be mounted on the dowel pin 212 and the rolling element may be positioned within the slot 216 of the lever arm, thereby coupling the lever arm 218 to the final parallel reduction gear 210 via the dowel pin 212 and the rolling element 214. The slot 216 may be elongated along the A'-B axis with rounded ends complementary to the radius of the rolling element 214 housed there within. The rolling element 214 may move along a length of slot 216 as the final parallel axis gear 210 rotates about point A'. The lever arm is free to rotate about point C (center of shaft 220). The center of the first parallel axis gear 206 and the final parallel axis gear 210 are aligned along the axis A-A' and the axis A'-B of the lever arm is at an angle α to the axis A-A'. In one example, the angle α may be in the range of 70 degrees and 110 degrees.

Rotational degrees of freedom of the lever arm 218 may be substantially lower than the rotational degrees of each of the first parallel axis gear 206 and the final parallel axis gear 210. In one example, a ratio of the rotational freedom of the lever arm 218 and the final parallel axis gear 210 may be 1:10. In another example, while the final parallel axis gear 210 may rotate a complete 360 degrees, the lever arm 218 may rotate up to 15 degrees on each side of the central A'-B axis.

A shaft 220 may be coupled to a second end of the lever arm 218, the second end distal from the first end. The second end of the lever arm 218 may include a circular disc 222 with the shaft 220 attached to the center of the disc 222. The shaft 220 may be perpendicular to the plane of the lever arm 218. The shaft may be coupled to a driveline shifting member such that rotation of the lever arm 218 may translate to shifting of the driving shifting member.

In one example, the drive motor 204 may drive in a first direction causing the first parallel axis gear 206 to rotate in a second direction (opposite to the first direction) about its center. The second parallel axis gear 208 also rotates in the second direction (along with the first parallel axis gear 206). The second parallel axis gear 208 causes the final parallel axis gear 210 to rotate in the first direction about its center at a reduced speed relative to the first parallel axis gear 206. Rotation of the final parallel axis gear 210 causes the rolling element 214 to rotate in the first direction about the final parallel axis gear 210, within the slot 216. Rotation of the rolling element may then be translated to rotation of the lever arm 218 in the second direction which may cause rotation of the shaft 220 in the second direction about point C. Similarly, the drive motor 204 may drive in a second direction causing the reverse actions thought the actuation system 200 (such as the shaft 220 rotating in the first direction).

In one example, the driveline shifting member may be a shift fork (such as shift fork of a transmission system (such as transmission system 101 in FIGS. 1A-B). A first position of the lever arm 218 corresponding to the rolling element 214 being at the center of the slot 216 may correspond to a 0 degree position of the shaft 220. Upon rotation of the final parallel axis gear 210 in the first (clockwise) direction, the rolling element 214 may move to a lower portion of the slot causing the lever arm 218 to move the shaft 220 to a first position which is at a first angle from the 0 degrees position. Similarly, upon rotation of the final parallel axis gear 210 in the second (anti-clockwise) direction, the rolling element 214 may move to an upper portion of the slot causing the lever arm 218 to move the shaft 220 to a second position which is at a second angle from the 0 degrees position. The second angle may be in opposite direction (relative to the 0 degrees position) to the first angle. As an example, the first angle may be 5 degrees in the positive direction from the 0 degrees position while the second angle may be 5 degrees in the negative direction from the 0 degrees position.

In one example, due to the arrangement of the components of the actuation system 200, a larger rotation of the drive motor 204 will be reduced to a finer movement of the lever arm 218 about point C. As an example, the rotation of the lever arm 219 may be one fourth of the rotation of the drive motor 204 that caused actuation of the lever arm 219.

Further, due to the trigonometry of the components of the actuation system 200, a torque increase may be achieved as a direct function of the length of the lever arm and the distance of the eccentric. This trigonometry benefit allows for the drive motor 204 to supply less activation torque to overcome the system loads.

FIG. 3 shows a representation of rotation of the shaft 220 coupling the actuation system and the shift fork. The neutral position of the shaft is shown by the 0 degrees line 310. The shaft may be actuated by the actuation system to rotate in a first direction (such as clockwise) to a first position 312. In one example, the first position may be in the range of two degrees and ten degrees. In another example, the first position is five degrees. Movement of the shaft to the first position 312 causes the shift fork to move to an engaged position of a first gear. In this way, by rotating the shaft of the actuation system to a pre-calibrated first position, a first gear of the transmission system may be engaged and the gear may be shifted from neutral to the first gear. The shaft may be also actuated by the actuation system to rotate in a second direction (such as anti-clockwise) to a second position 314. In one example, the second position may be in the range of negative two degrees and ten degrees. In another example, the second position is negative five degrees. Movement of the shaft to the second position 314 causes the shift fork to move to an engaged position of a second gear. In this way, by rotating the shaft of the actuation system to a pre-calibrated second position, a second gear of the transmission system may be engaged and the gear may be shifted from neutral to the second gear. Rotation of the shaft in the first direction may be carried out by rotating the actuator (such as motor) of the actuation system in a first direction while rotation of the shaft in the second direction may be carried out by rotating the actuator (such as motor) of the actuation system in a second, opposite direction.

Returning to FIG. 2, a position sensor may be coupled to one or more components of the actuation system 101. In this example, a position sensor 224 may be coupled to the final parallel axis gear 210 or the lever arm 218. The position sensor 224 may determine the current position (such as an angle) of the shaft 220. A shift fork position may be inferred from the shaft position such as it may be determined if the transmission system is in a neutral or a gear (first or second) is engaged. A determination of a current gear engagement status may be carried out prior to a change in gear position. The current position of the shaft may be used as a parameter to determine the degree of rotation of the shaft needed to shift to a commanded gear position. As an example, if the first gear is engaged, the shaft will be in a first position. Upon receiving a command from an operator to shift the gear from the first gear to a second gear, the controller may determine the current position of the shaft via the position sensor 224. Upon determination of the first position of the shaft via the position sensor, the actuator 204 may estimate the degree of rotation of the first parallel axis gear 206 needed that would translate to rotation of the shaft by a desired amount for disengagement of the first gear and then engagement of the second gear. As an example, if the position sensor determines that the shaft is at positive five degree angle, the controller may determine that the shaft is to be shifted by five degrees to reach neutral and then another five degrees to reach a negative five degrees where the shift fork may engage the second gear.

FIGS. 6A-B shows a side view 600 and a perspective view 650, respectively, of a sensor 224 coupled to one or more components of the actuation system of FIG. 2. The sensor 224 may include a first portion 602 projecting outward from the component it is coupled to, and a second portion 604 inserted into the component. The sensor may be coupled to the casing of the component via a bolt passing through the opening 608. The sensor may include one or more heat fins 606 longitudinally positioned on a surface of the second portion 604 of the sensor 224. The sensor may be one of an inductive sensor and a Hall Effect sensor.

FIG. 4 shows a perspective view 400 of a vehicle component 402 including two actuation systems of FIG. 2. The vehicle component may be a transmission assembly including multiple transmission gears actuatable via one or more shift forks. In this example, two sets of actuation systems may be coupled to the vehicle component 402. A first actuation system may be coupled to a first shaft 410 and a second actuation system may be coupled to a second shaft 412. Each of the first shaft 410 and the second shaft 412 may be coupled to separate shift forks which may be independently actuated. As an example, the first and the second actuation systems may operate in parallel or one at a time to actuate the separate shift forks, each shift fork operating a separate set of transmission gears.

FIG. 5 shows a top view of the component 402 of FIG. 4 including two actuation systems. The first shaft 410 is coupled to a first shift fork 510 via a first arm 504 while the second shift fork 512 is coupled to the second shift fork 512 via a second arm 506. Rotation of the first shaft 410 via the first actuation system may actuate the first shift fork 510 via the first arm 504 to engage or disengage a transmission gear. Similarly, rotation of the second shaft 412 via the actuation system may actuate the second shift fork 512 via the second arm 506 to engage or disengage another transmission gear.

The systems in FIGS. 1A-6B enable a controller with computer-readable instructions stored on non-transitory memory that when executed cause the controller to: during a first condition, rotate an actuator coupled to a parallel axis gear system in a first direction to rotate a lever arm in a second direction and shift a shift fork to a first position to engage a first gear of a transmission system; and during a second condition, rotate the actuator coupled to the parallel axis gear system in a second direction to rotate the lever arm in a first direction and shift a shift fork to a second position to engage a second gear of the transmission system. The first condition may include an user selecting the first gear via input to an onboard instrument panel and the second condition may include the user selecting the second gear via input to the onboard instrument panel.

Figure 7:
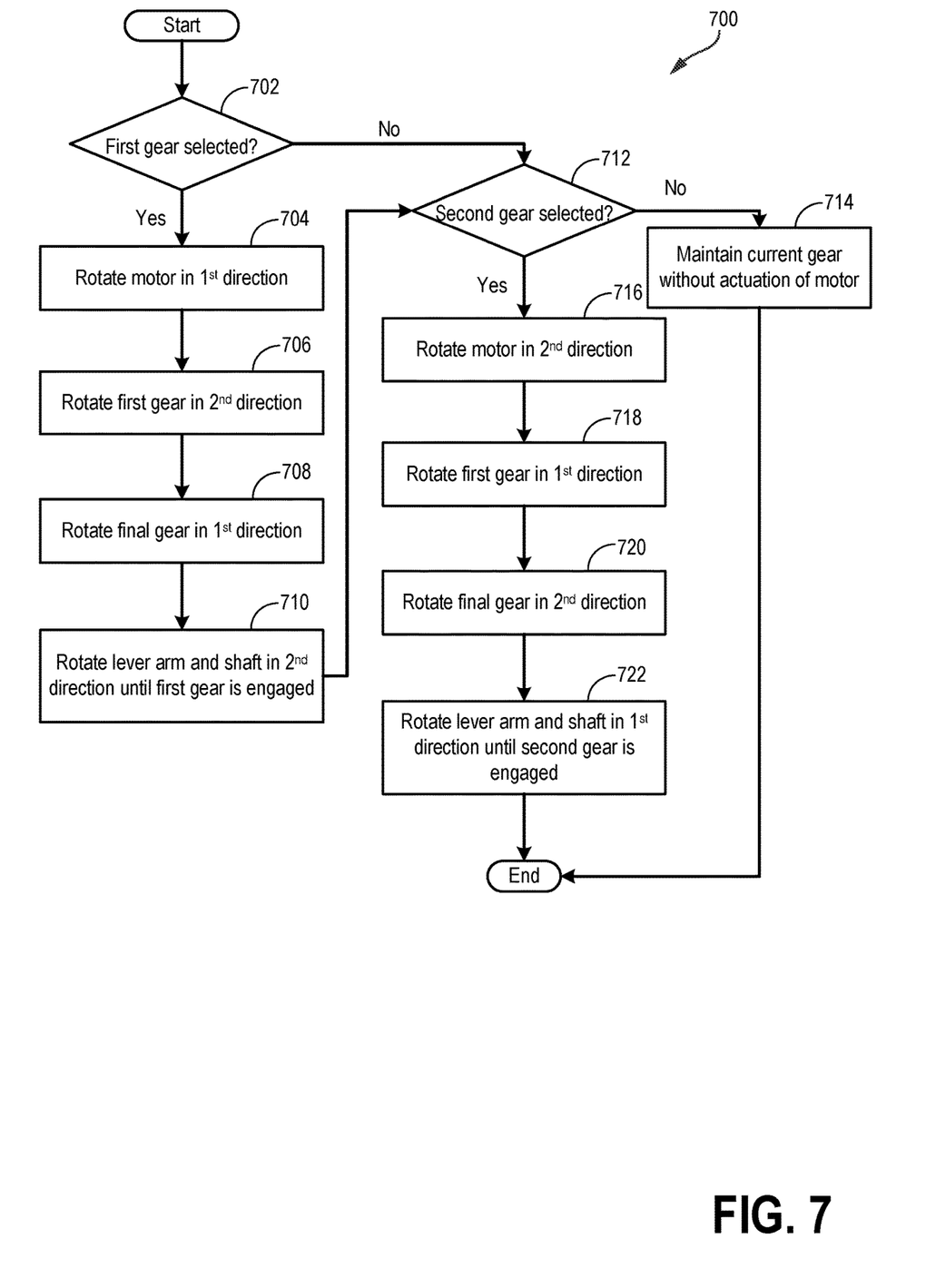
FIG. 7 shows a flow-chart illustrating an example method for operating the actuation system for the shift fork.

FIG. 7 shows an example method 700 for operating an actuation system (such as electronic actuation system 200 in FIG. 2) of a transmission system (such as transmission system 101 in FIGS. 1A-B). The transmission system may include a plurality of gears, and gear of the system may be engaged via the actuation system based on vehicle operating conditions or upon selection of a gear by a user. Instructions for carrying out method 700 and the rest of the methods included herein may be executed by a controller based on instructions stored on a memory of the controller and in conjunction with signals received from sensors of the vehicle system. The controller may employ engine actuators of the vehicle system to adjust engine operation, according to the methods described below.

At 702, the routine includes determining if a first gear of the transmission system has been selected. As an example, a vehicle operator may select a first gear of the transmission system via an onboard instrument panel. When the first gear is selected, the controller may actuate a shift fork of the transmission system in a desired second direction to engage with the first gear.

If it is determined that the first gear is selected, at 704, a drive motor/pinion gear (such as drive motor/pinion gear 204 in FIG. 2) of the electronic actuation system may be rotated in a first direction. The controller may send a signal to the actuator of the motor/pinion gear to rotate the motor/pinion gear in the first direction. In one example, the first direction may be a counter-clockwise direction.

At 706, rotation of the motor/pinion gear in the first direction may cause the first gear (such as first parallel axis gear 206 in FIG. 2) of the parallel axis gear train meshed with the motor/pinion gear to rotate in a second direction. As an example, the second direction may be a clockwise direction. At 706, rotation of the first gear in the second direction may cause a second gear (such as second parallel axis gear 208 in FIG. 2) mounted at the center of the first gear to rotate in the first direction.

At 708, a final gear (such as final parallel axis gear 210 in FIG. 2) of the actuation system meshed with the second gear may rotate in the first direction about its axis. Rotation of the final gear may cause the lever arm fixed to and eccentric to the final gear via a drive pin (such as dowel pin 212 in FIG. 2) to rotate. As the final gear rotates, the lever arm may rotate and slide along the slot housing the drive pin. At 710, the lever arm may be rotated in the second direction which may cause an output shaft (such as output shaft 220 in FIG. 2) coupled to an end of the lever to rotate in the second direction. Rotation of the output shaft in the second direction may cause the shift fork to be moved to an engaged position of the first gear. The shaft may be rotated until the first gear is engaged. The routine may then proceed to step 712.

If at 702, it is determined that the first gear of the transmission system has not been selected by the user, the routine may proceed to step 712. At 712, the routine includes determining if a second gear of the transmission system has been selected. As an example, a vehicle operator may select a second gear of the transmission system via the onboard instrument panel. When the second gear is selected, the controller may actuate a shift fork of the transmission system in a desired first direction to engage with the second gear. If it is determined that second gear of the transmission system is not selected, at 714, the transmission system may be maintained in the current mode. As an example, the transmission system may be maintained in the first gear or any other gear of the transmission system currently engaged to the shift fork.

If it is determined that the second gear is selected, at 716, the drive motor/pinion gear of the electronic actuation system may be rotated in the second direction. The controller may send a signal to the actuator of the motor/pinion gear to rotate the motor/pinion gear in the second direction. In one example, the second direction may be a clockwise direction.

At 718, rotation of the motor/pinion gear in the second direction may cause the first gear of the parallel axis gear train meshed with the motor/pinion gear to rotate in a first direction. As an example, the first direction may be a counter-clockwise direction. At 720, rotation of the first gear in the first direction may cause the second gear mounted at the center of the first gear to rotate in the second direction.

At 720, the final gear of the actuation system meshed with the second gear may rotate in the second direction about its axis. Rotation of the final gear may cause the lever arm fixed to and eccentric to the final gear via a drive pin (such as dowel pin 212 in FIG. 2) to rotate. As the final gear rotates, the lever arm may rotate and slide along the slot housing the drive pin. At 722, the lever arm may be rotated in the first direction which may cause the output shaft coupled to an end of the lever to rotate in the first direction. Rotation of the output shaft in the first direction may cause the shift fork to be moved to an engaged position of the second gear. The shaft may be rotated until the second gear is engaged. The routine may then end.

In this way, a parallel axis gear coupled to a lever arm may be rotated through a dowel in a slot of the lever arm, the dowel fixed to the final parallel axis gear, to rotate the lever arm and a driveline shifting member may be engaged and disengaged by rotation of lever arm, the rotational degrees of the lever arm substantially less than rotational degrees of the drive motor.

In one example, an actuation system in a transmission system of a vehicle, comprises: an actuator coupled to a lever arm via one or more parallel axis gears, and a shaft connecting the lever arm to a driveline shifting member, the lever arm driven via an eccentric rolling element housed within a slot in the lever arm. In the preceding example, additionally or optionally, the one or more parallel axis gears include a first parallel axis gear, a second parallel axis gear, and a final parallel axis gear coupled to a first end of the lever arm via the eccentric rolling element and wherein the shaft is coupled to a second end of the lever arm, the first end distal from the second end. In any or all of the preceding examples, additionally or optionally, the rolling element is mounted on a dowel pin eccentrically fixed to the final parallel axis gear, the rolling element rotatable about the dowel pin. In any or all of the preceding examples, additionally or optionally, the actuator is an electric motor coupled to the first parallel axis gear. In any or all of the preceding examples, additionally or optionally, the first parallel axis gear is coupled to the final parallel axis gear via the second parallel axis gear and wherein the second parallel axis gear is fixed to a center of the first parallel axis gear, the second parallel axis gear in face sharing contact with a perimeter of the final parallel axis gear. In any or all of the preceding examples, additionally or optionally, each of the first parallel axis gear, the final parallel axis gear, and the lever arm are coplanar with the longitudinal axis of the lever arm making an angle to an axis connecting a center of the first parallel axis gear to the center of the final parallel axis gear, and wherein the shaft is perpendicular to a plane of the lever arm. In any or all of the preceding examples, additionally or optionally, the driveline shifting member is a shift fork in the transmission, an arm of the shift fork actuated via a movement of the lever arm and the shaft. In any or all of the preceding examples, additionally or optionally, the actuator rotating in a first direction rotates the lever arm in a second direction and shifts the arm of the shift fork from a neutral position to a first position. In any or all of the preceding examples, additionally or optionally, the actuator rotating in the second direction rotates the lever arm in the first direction and shifts the arm of the shift fork from the neutral position to a second position, the second direction opposite to the first direction. In any or all of the preceding examples, additionally or optionally, the neutral position corresponds to the shift fork not engaging any gears of the transmission, the first position corresponds to the shift fork solely engaging a first gear of the transmission system, and the second position corresponds to the shift fork solely engaging a second gear of the transmission system. Any or all of the preceding examples, further comprising, additionally or optionally, a position sensor coupled to one of the lever arm and the final parallel axis gear.

In another example, a method for transmission system, comprises: rotating a parallel axis gear coupled to a lever arm through a dowel in a slot of the lever arm, the dowel fixed to the parallel axis gear, to rotate the lever arm, and engaging and disengaging a driveline shifting member by the rotation of the lever arm, the rotational degrees of the lever arm substantially less than rotational degrees of the parallel axis gear. In the preceding example, additionally or optionally, rotation of the lever arm is fixed about an end connection of the lever arm to a rotational shaft, the shaft coupled to a shift fork. In any or all of the preceding examples, additionally or optionally, rotation of a first angle in a positive direction from an origin of the lever arm actuates the driveline shifting member to a first position, and wherein rotation of a second angle in a negative direction from the origin of the lever arm actuates the driveline shifting member to a second position. In any or all of the preceding examples, additionally or optionally, the first position corresponds to engagement of a first gear of the transmission system and the second position correspond to engagement of a second gear of the transmission system.

In yet another example, method for a vehicle, comprises: a controller with computer-readable instructions stored on non-transitory memory that when executed cause the controller to: during a first condition, rotate an actuator coupled to a parallel axis gear system in a first direction to rotate a lever arm in a second direction and shift a shift fork to a first position to engage a first gear of a transmission system, and during a second condition, rotate the actuator coupled to the parallel axis gear system in a second direction to rotate the lever arm in a first direction and shift a shift fork to a second position to engage a second gear of the transmission system. In the preceding example, additionally or optionally, the first condition includes a user selecting the first gear via input to an onboard instrument panel and wherein the second condition includes the user selecting the second gear via input to the onboard instrument panel. In any or all of the preceding examples, additionally or optionally, a first end of the lever arm is coupled to a final parallel axis gear of the parallel axis gear system via an eccentric rolling element housed within a slot in the lever arm, and a second end of the lever arm is coupled to an output shaft. In any or all of the preceding examples, additionally or optionally, the output shaft is coupled to the shift fork, and wherein rotation of the shaft in the second direction shifts the shift fork to the first position, and rotation of the shaft in the first direction shifts the shift fork to the second position, the first direction opposite to the second direction. In any or all of the preceding examples, additionally or optionally, the final parallel axis gear is coupled to a second parallel axis gear, the second parallel axis gear is coupled to and concentric to a first parallel axis gear, and the first parallel axis gear is coupled to the actuator.

FIGS. 4 and 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a transmission system, comprising:
   rotating a parallel axis gear coupled to a lever arm through a dowel in a slot of the lever arm, the dowel fixed to the parallel axis gear, to rotate the lever arm, wherein an actuator is coupled to the lever arm via the parallel axis gear; and
   engaging and disengaging a driveline shifting member by the rotation of the lever arm, the rotational degrees of the lever arm substantially less than rotational degrees of the parallel axis gear, wherein rotation of the lever arm is fixed about an end connection of the lever arm to a rotational shaft, the shaft coupled to a shift fork.

2. The method of claim 1, wherein rotation of a first angle in a positive direction from an origin of the lever arm actuates the driveline shifting member to a first position, and wherein rotation of a second angle in a negative direction from the origin of the lever arm actuates the driveline shifting member to a second position.

3. The method of claim 2, wherein the first position corresponds to engagement of a first gear of the transmission system and the second position correspond to engagement of a second gear of the transmission system.

4. The method of claim 1, wherein the parallel axis gear is one of a plurality of gears in a parallel axis gear train.

5. The method of claim 4, wherein the actuator includes a motor connected to the parallel axis gear train.

6. The method of claim 5, wherein the dowel is coupled to a final gear of the parallel axis gear train.

7. The method of claim 6, wherein the dowel is eccentric to the final gear to generate a cam effect.

8. The method of claim 4, wherein the parallel axis gear train includes a first parallel axis gear, a second parallel axis gear, and a final parallel axis gear.

9. The method of claim 8, wherein the first parallel axis gear is coupled to the final parallel axis gear via the second parallel axis gear and wherein the second parallel axis gear is fixed to a center of the first parallel axis gear, the second parallel axis gear in face sharing contact with a perimeter of the final parallel axis gear.

10. The method of claim 8, wherein each of the first parallel axis gear, the final parallel axis gear, and the lever arm are coplanar with a longitudinal axis of the lever arm making an angle to an axis connecting a center of the first parallel axis gear to a center of the final parallel axis gear.

11. The method of claim 1, wherein the shift fork is coupled in the transmission system.

12. A method for a vehicle transmission, comprising:
   rotating a parallel axis gear coupled to a lever arm through a dowel in a slot of the lever arm via an actuator coupled to the lever arm, the dowel fixed to the parallel axis gear, to rotate the lever arm; and
   shifting a driveline shifting member of the vehicle transmission by rotation of the lever arm engaging and disengaging the driveline shifting member, the rotational degrees of the lever arm substantially less than rotational degrees of the parallel axis gear.

13. The method of claim 12, wherein rotation of the lever arm is fixed about an end connection of the lever arm to a rotational shaft, the shaft coupled to a shift fork.

14. The method of claim 12, wherein rotation of a first angle in a positive direction from an origin of the lever arm actuates the driveline shifting member to a first position, and wherein rotation of a second angle in a negative direction from the origin of the lever arm actuates the driveline shifting member to second position.

15. The method of claim 14, wherein the first position corresponds to engagement of a first gear of the transmission and the second position corresponds to engagement of a second gear of the transmission.

\* \* \* \* \*